US010370212B1

(12) United States Patent
Atwood et al.

(10) Patent No.: US 10,370,212 B1
(45) Date of Patent: Aug. 6, 2019

(54) CENTER REGISTRATION SYSTEM (71) Applicant: Xerox Corporation, Norwalk, CT (US)

(72) Inventors: Christopher Douglas Atwood, Rochester, NY (US); Robert W. Phelps, Victor, NY (US); Paul F. Sawicki, Rochester, NY (US); John R. Uchal, Webster, NY (US); James Edward Williams, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/975,918

(22) Filed: May 10, 2018

(51) Int. Cl.
*B65H 5/06* (2006.01)
*B65H 9/16* (2006.01)
*B65H 9/10* (2006.01)
*G03G 15/00* (2006.01)

(52) U.S. Cl.
CPC .............. *B65H 9/166* (2013.01); *B65H 9/106* (2013.01); *G03G 15/6567* (2013.01); *B65G 2207/34* (2013.01); *B65H 5/062* (2013.01); *B65H 2404/15212* (2013.01); *B65H 2404/54* (2013.01); *G03G 2215/00565* (2013.01)

(58) Field of Classification Search
CPC .................... B65H 9/002; B65H 5/062; B65H 2404/15212; B41J 13/32; B65G 2207/34
See application file for complete search history.

(56) References Cited

U.S. PATENT DOCUMENTS

| | | | |
|---|---|---|---|
| 4,179,117 A | 12/1979 | Rhodes, Jr. | |
| 4,775,142 A | 10/1988 | Silverberg | |
| 5,065,998 A | 11/1991 | Salomon | |
| 6,059,284 A * | 5/2000 | Wolf | B65H 5/062 271/227 |
| 6,554,276 B2 | 4/2003 | Jackson et al. | |
| 7,731,188 B2 * | 6/2010 | Dejong | B65H 7/02 271/273 |
| 9,156,642 B2 * | 10/2015 | Dunham | G03G 15/6582 |
| 10,109,138 B2 * | 10/2018 | Lundblad | G07F 19/202 |
| 2015/0217958 A1 | 8/2015 | Dunham et al. | |
| 2015/0284203 A1 * | 10/2015 | Terrero | B65H 9/101 271/228 |

FOREIGN PATENT DOCUMENTS

WO  WO-2016118068 A1 *  7/2016  ......... G07D 11/0036

OTHER PUBLICATIONS

U.S. Appl. No. 15/939,907, filed Mar. 29, 2018, Irizarry et al.

* cited by examiner

*Primary Examiner* — Howard J Sanders
(74) *Attorney, Agent, or Firm* — Fay Sharpe LLP (57) ABSTRACT

A registration system includes nip rollers for conveying a sheet in a process direction when the nip rollers are in an engaged position, and first and second sets of omnidirectional rollers arranged perpendicularly to each other, for conveying the sheet in the process and cross-process directions, respectively. The omnidirectional rollers each allow the sheet to slide, relative to the omnidirectional roller, in a direction parallel to an axis of rotation of the omnidirectional roller. The nip-rollers are movable from the engaged position to a disengaged position, in which the first pair of omnidirectional rollers convey the sheet in the process direction. A feedback system includes sensors for determining registration errors of the sheet and a control system controls the omnidirectional rollers to reduce the registration errors in the sheet while the nip-rollers are in the disengaged position.

20 Claims, 8 Drawing Sheets

CENTER REGISTRATION SYSTEM

BACKGROUND

The exemplary embodiment relates generally to sheet registration systems and finds particular application in connection with a controllable registration system for sheet media which is suited to use in a printing system.

Transport systems are widely used for transporting sheet media between and within modules of a printing system, such as between a sheet feeder and a marking module, or on a return path through the marking module to enable duplex (double sided) printing. The transport system may include a combination of rollers, conveyor belts, vacuum-assisted transport units, and the like. To ensure that each sheet arrives at the marking module with an acceptable level of skew and lateral errors, transport systems incorporate registration systems to steer the sheets to achieve correct alignment.

There are demands for new printer designs that can accommodate larger sheet sizes (e.g., to about 66 cm, or greater) without reducing printer speeds. For the registration system, steering long sheets at high speeds is challenging. At high speeds, the time available to perform the registration correction is reduced, which can increase stresses on the sheets. The trailing edge of the sheet may swing out of alignment, creating a 'tail-wag' motion of the sheet, when the leading edge of the sheet undergoes correction. This means that sheets may not be correctly registered if their input error is too large, resulting in sheet damage, jams, or sheet slippage, with sheets breaking free of the drive nips, resulting in poor registration.

One type of registration subsystem uses independent drive rolls for correcting skew while lateral correction is effected by a translating (cross process) carriage. This has an advantage of decoupling the lateral and skew correction. However, the use of the translating carriage limits the maximum speed of the printer system due to the limit on the carriage return time that can be achieved, given the mass of the carriage (including motors, rollers and other drive elements).

Another method used to enable registering large sheets is to adjust the positions of preceding modules manually, to try to keep the input error to the marking module low. However, such module alignment procedures impact only the mean input error and are unable to address sheet-to-sheet variations. Thus, even though average input error may be within acceptable bounds, sheet-to-sheet variations can result in misregistration of some of the sheets.

There remains a need for systems and methods for media registration which address these deficiencies and enable improvements in the capability of a printing system to handle faster sheet speeds, larger sheet sizes, and/or larger weight sheets.

INCORPORATION BY REFERENCE

The following references, the disclosures of which are incorporated in their entireties by reference, are mentioned:

U.S. application Ser. No. 15/939,907, filed on Mar. 29, 2018, entitled GRAVITY-ASSISTED WALL REGISTRATION SYSTEM, by Roberto A. Irizarry, et al., describes a gravity-assisted wall registration system with an angled surface which allows sheets to slide, under gravity, into contact with a registration wall, while being driven in a downstream direction.

U.S. Pub. No. 20150284203, published Oct. 8, 2015, entitled FINISHER REGISTRATION SYSTEM USING OMNIDIRECTIONAL SCUFFER WHEELS, by Terrero, et al., describes a sheet registration system for use in a finisher of a digital printing system. Omnidirectional scuffer wheels with a plurality of overlapping rollers provide uninterrupted traction to move media sheets against a registration wall for process direction registration.

U.S. Pub. No. 20150217958, published Aug. 6, 2015, entitled SYSTEMS AND METHODS FOR IMPLEMENTING UNIQUE OFFSETTING STACKER REGISTRATION USING OMNI-DIRECTIONAL WHEELS FOR SET COMPILING IN IMAGE FORMING DEVICES, by Dunham, et al., describes a substrate handling device, downstream of the output of a compiler, which uses omnidirectional wheeled devices that provide drive (traction) normal to a motor axis under control of one of a respective plurality of independent motors while allowing sliding in the motor axis direction.

U.S. Pat. No. 4,179,117, issued Dec. 18, 1979, entitled PAPER ALIGNMENT ROLLERS, by Rhodes, Jr., describes paper aligning rolls in which the drive roll is skewed to the direction of travel move paper toward a referencing edge while the backup roll is oppositely skewed to urge the paper away from the referencing edge.

U.S. Pat. No. 4,775,142, issued Oct. 4, 1988, entitled ROLLER APPARATUS FOR SIDE REGISTRATION OF DOCUMENTS, by Silverberg, describes an apparatus for urging documents against a registration fence while simultaneously driving the documents along a conveying path determined by the fence.

U.S. Pat. No. 5,065,998, issued Nov. 19, 1991, entitled LATERAL SHEET REGISTRATION SYSTEM, by Salomon, describes a sheet registration and feeding system for laterally registering a sheet without frictional drive slippage against the sheet.

U.S. Pat. No. 6,554,276, issued Apr. 29, 2003, entitled FLEXIBLE SHEET REVERSION USING AN OMNI-DIRECTIONAL TRANSPORT SYSTEM, by Jackson, et al., describes a flexible sheet handling apparatus including a reversion section for rotating the flexible sheet about an axis of motion.

BRIEF DESCRIPTION

In accordance with one aspect of the exemplary embodiment, a registration system includes nip rollers for conveying a sheet in a process direction when the nip rollers are in an engaged position, and omnidirectional rollers including a first set of omnidirectional rollers, which are spaced from each other in a cross-process direction and which have a roller axis of rotation parallel to the cross-process direction, for conveying the sheet in the process direction, and a second set of omnidirectional rollers, which are spaced from each other in the process direction and which have a roller axis of rotation parallel to the process direction, for conveying the sheet in the cross-process direction. The omnidirectional rollers each allow the sheet to slide, relative to the omnidirectional roller, in a direction parallel to the axis of rotation of the omnidirectional roller. The nip-rollers are movable from the engaged position to a disengaged position, in which the first pair of omnidirectional rollers convey the sheet in the process direction. A feedback system determines registration errors of the sheet and controls the omnidirectional rollers to reduce the registration errors in the sheet while the nip-rollers are in the disengaged position.

In accordance with another aspect of the exemplary embodiment, a registration method includes conveying a sheet in a process direction with nip rollers that are in an engaged position and a first set of omnidirectional rollers, the nip rollers and first set of omnidirectional rollers each having a roller axis of rotation parallel to a cross-process direction, for conveying the sheet in the process direction. Readings for the sheet are received from registration sensors and adjustments for a second set of omnidirectional rollers are computed to reduce a skew and a lateral shift of the sheet, based on the sensor readings. The omnidirectional rollers in the second set each have a roller axis of rotation parallel to the process direction. The nip rollers are moved from the engaged position to a disengaged position and, while the nip rollers are in the disengaged position, the adjustments are implemented with the second set of omnidirectional rollers and the sheet is conveyed in the process direction with the first set of omnidirectional rollers.

In accordance with another aspect of the exemplary embodiment, a printing system includes a sheet feeder, a marking engine, and a registration system on a paper path intermediate the sheet feeder and the marking engine. The registration system includes pairs of nip rollers for conveying a sheet in a process direction when the nip rollers are in an engaged position, the nip rollers being movable to a disengaged position in which they do not convey the sheet. A first set of omnidirectional rollers includes omnidirectional rollers which are spaced from each other in a cross-process direction and which have a roller axis of rotation parallel to the cross-process direction, for conveying the sheet in the process direction, the omnidirectional rollers in the first set being intermediate respective pairs of the nip rollers in the process direction. A second set of omnidirectional rollers includes omnidirectional rollers which are spaced from each other in the process direction and which have a roller axis of rotation parallel to the process direction, for conveying the sheet in the cross-process direction. The omnidirectional rollers in the first and second sets each allowing the sheet to slide, relative to the omnidirectional roller, in a direction parallel to the axis of rotation of the omnidirectional roller. A set of registration sensors provide readings for determining registration errors in the sheet, the registration errors including a skew and a lateral shift of the sheet. A control system controls the second set of omnidirectional rollers to reduce the registration errors in the sheet while the nip-rollers are in the disengaged position.

DETAILED DESCRIPTION

Aspects of the exemplary embodiment relate to a center registration system a printer incorporating the registration system, and to a registration method. The apparatus and method described herein are particularly suited to registering extended-size papers of 85 cm and greater (in the longest dimension). The registration system can be integrated into an existing paper path, with relatively minor modifications.

The registration system is described with particular reference to a xerographic (laser) printer, although it will be appreciated that other printers and sheet processing devices are contemplated.

As used herein, a "printer," or a "printing system" refers to one or more devices used to generate printed media by forming images on print media, using a marking material, such as one or more colored inks or toner particles. The printer may be a digital copier, bookmaking machine, facsimile machine, multi-function machine, or the like, which performs a print outputting function. The print media may be sheets of paper, card, transparencies, parchment, film, fabric, plastic, photo-finishing papers, or other coated or non-coated flexible substrates suitable for printing.

The printer includes a marking module which may incorporate one or more xerographic marking devices (marking engines) in which toner particles are transferred from an electrically charged surface to the print media and then fused to the sheet. Alternatively, the printer may be inkjet printer which incorporates an inkjet marking device including inkjet heads which jet droplets of ink onto the print media, which are then cured, e.g., with ultraviolet radiation. Other marking devices are also contemplated. The printer may be configured for monochrome (single color) and/or color (more than one color) printing.

The "leading edge" of a sheet of print media refers to an edge of the sheet that is furthest downstream in the process direction. The "process direction" refers to the direction in which a sheet travels along a paper path during the printing process. The "cross-process direction" is perpendicular to the process direction, in the plane of the sheet.

While some components of the printer are described herein as modules, this is not intended to imply that they are separately housed from each other and in some embodiments, may be otherwise separated into different housings or contained in a single printer housing.

Figure 1:
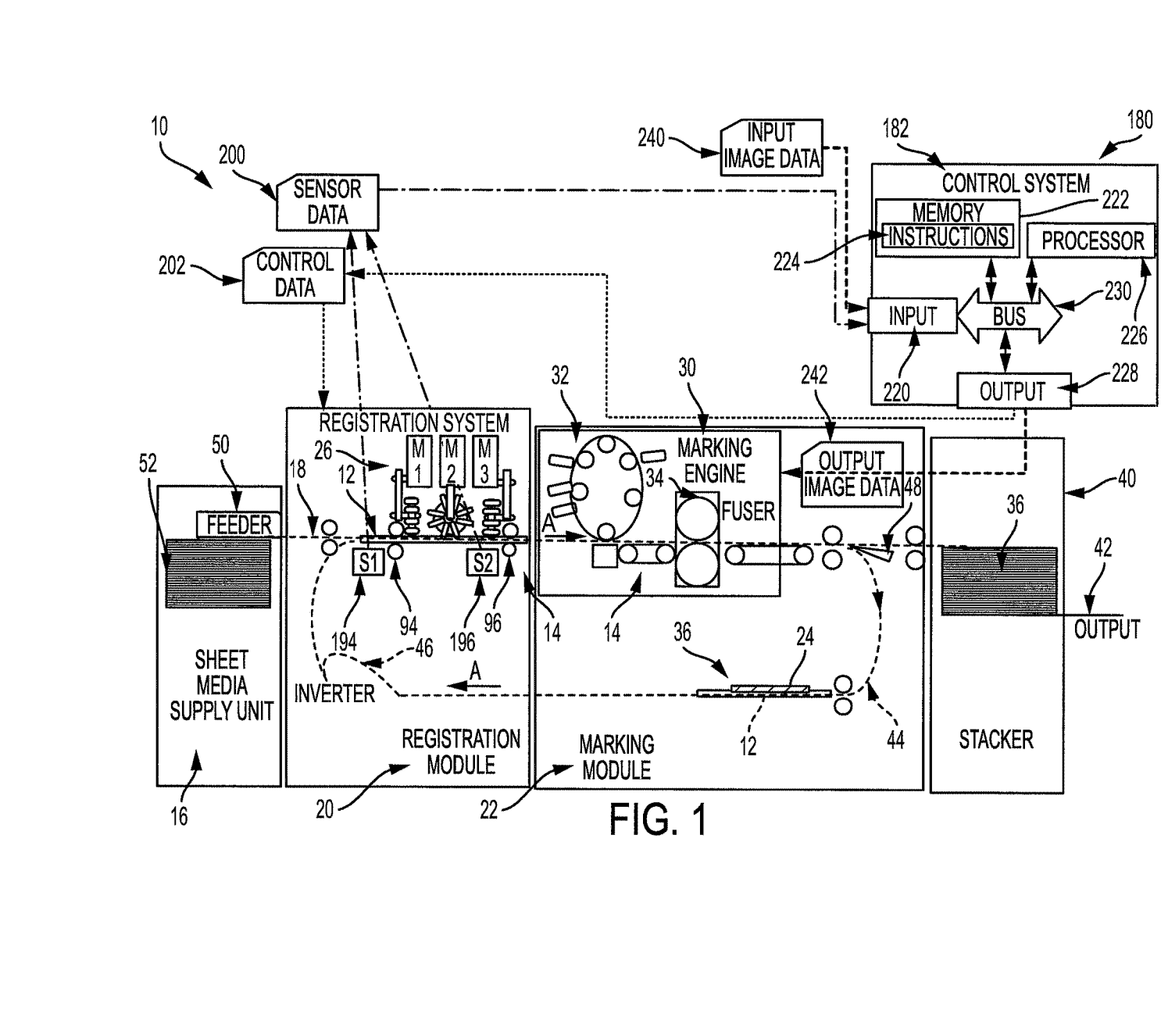
FIG. 1 is a schematic side sectional view of a printer incorporating a centering registration system in accordance with one aspect of the exemplary embodiment.

FIG. 1 is a schematic illustration of an exemplary printer 10. The printer is configured for forming images on sheets 12 of print media, such as paper, using a marking material, such as inks or toners. The printer 10 may be a xerographic printer, as illustrated, an inkjet printer, combination thereof, or the like. A sheet transport system 14 conveys sheets to be printed from a sheet media supply unit 16 along a paper path 18 in the downstream (process) direction, illustrated by arrow A to a registration module 20, where the sheets are individually registered, to reduce skew and lateral shift (in the cross-process direction), prior to being marked in a marking module 22. Independent of the type of marking module 22, skew and/or lateral shift in the sheet 12, as it passes through the marking module, can result in incorrect positioning of an image 24 on the sheet 12 and other problems, such as damage to the sheet, paper jams, wear on printer components, and so forth. The registration module 20 includes a center registration system 26, as further described below, which provides accurate sheet registration, while minimizing such problems.

The marking module 22 includes a making engine 30, where the marking material is applied to the sheets 12 by a suitable marking device 32. In the case of a xerographic printer, the marking device 32 may include a photoconductive surface, such as a belt or drum. The photoconductive surface is charged at one or more charging stations (one in the case of a monochrome printer, three, four, or more in the case of a multi-color printer), exposed at a respective exposure station to form a latent image, and developed at a developer station, by attracting charged toner particles to the latent image, thereby forming an image on the photoconductive surface. The image is transferred to the passing sheet 12 at a transfer station. As will be appreciated, in an inkjet printing system, an array of ejectors drop ink droplets onto the passing sheet. The marking engine 30 further includes a fixing device 34, where the marking material is more permanently affixed to the sheet. In a xerographic printer, the fixing device 34 may include a fuser, which applies heat and pressure to the marked sheet 36. In the case of an inkjet printer the inks may be cured with heat and/or UV radiation.

The sheet transport system 14 conveys the printed sheets 36 to one or more post processing devices 40, such as a stacker, stapler, folder, collator, bookbinder, combination thereof, or the like, before outputting the printed sheets at a sheet output 42, such as an output tray. In the illustrated printer, the paper path 18 includes a return loop 44, which returns the sheets to the marking engine 30, e.g., via an inverter 46, to allow printing on the other side of the sheet. A diverter 48 may be used to divert the sheets into the return loop 44, when needed.

The transport system 14 may include various mechanisms for conveying the sheets, such as rollers, drive nips, belts, air/vacuum assisted transport mechanisms, and the like. In particular, a sheet feeder 50 draws sheets singly from a sheet stack 52 in the supply unit 16 and sends them in single file along the paper path 18.

The center registration system 26 repositions each sheet 12, as needed, to reduce skew and/or lateral shift before the sheets are marked with the marking device 32. As will be appreciated, one or more such registration systems 26 may be alternatively or additionally positioned elsewhere along the paper path 18, such as downstream of the marking engine 30, and/or between the marking device 32 and the fixing device 34. In the exemplary embodiment, the registration system 26 is positioned to receive sheets directly from the feeder 50, align them, and pass the sheets directly to the marking engine 30.

Figure 2:
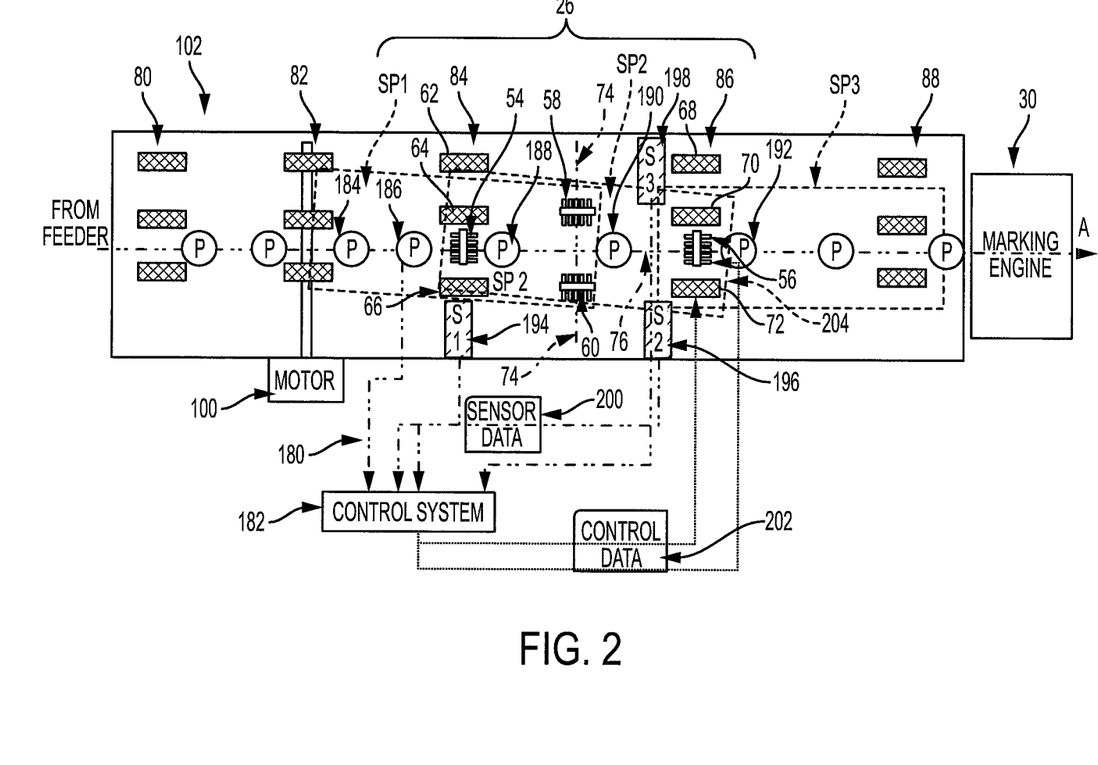
FIG. 2 is a top plan view of one embodiment of the centering registration system of FIG. 1.

With reference also to FIG. 2, the registration system 26 includes transport members which in the illustrated embodiment include a set of omnidirectional rollers 54, 56, 58, 60 and several pairs 60, 62, 64, 66, 68, 70, 72, etc. of nip rollers. A first set (one or more, such as at least two) of the omnidirectional rollers 58, 60 are forward motion rollers and have an axis of rotation 74 which is parallel to the cross-process direction. A second set (two or more) of the omnidirectional rollers 54, 56 are lateral motion rollers and have an axis of rotation 76 which is parallel to the process direction. The axes of rotation of the sets of omnidirectional rollers thus intersect at an angle of 90°.

Omnidirectional rollers 58, 60 in the first set are intermediate respective adjacent pairs 64, 70 and 66, 72 of nip rollers in the process direction and can replace conventional nip rollers which would otherwise be equally spaced between pairs of nip rollers 64, 70, and 66, 72, respectively, in the process direction. Omnidirectional rollers 54, 56 may be equally spaced between pairs of nip rollers 64, 66 and 70, 72, respectively, in the cross-process direction. As will be appreciated, there may be more than four omnidirectional rollers to ensure that the sheet can be driven by pairs of lateral and forward direction omnidirectional rollers at the same time. The omnidirectional rollers 54, 56, 58, 60 each allow the sheet to slide, relative to the omnidirectional roller, in a direction parallel to the axis of rotation of the omnidirectional roller. While the omnidirectional rollers are shown positioned above the sheet to contact an upper surface 78 of the sheet (FIG. 3), in other embodiments, they may be positioned below the sheet, to make contact with a lower surface 79 of the sheet, or the omnidirectional rollers may be arranged in pairs, one above the sheet, the other directly below it, beneath the sheet.

The nip rollers 60, 62, 64, 66, 68, 70, 72 serve to convey the sheet in the process direction, except during sheet registration by the omnidirectional rollers 54, 56, 58, 60, when the first set of omnidirectional rollers 58, 60 takes over the role of conveying the sheet in the process direction. The nip rollers 60, 62, 64, 66, 68, 70, 72 may be arranged in columns 80, 82, 84, 86, 88, each column including at least two pairs of nip rollers (such as at least three, four, five, or more pairs of nip rollers), such that at any time, a sheet is conveyed by at least two pairs of nip rollers from one column and at least two pairs of nip rollers from a downstream column.

Figure 3:
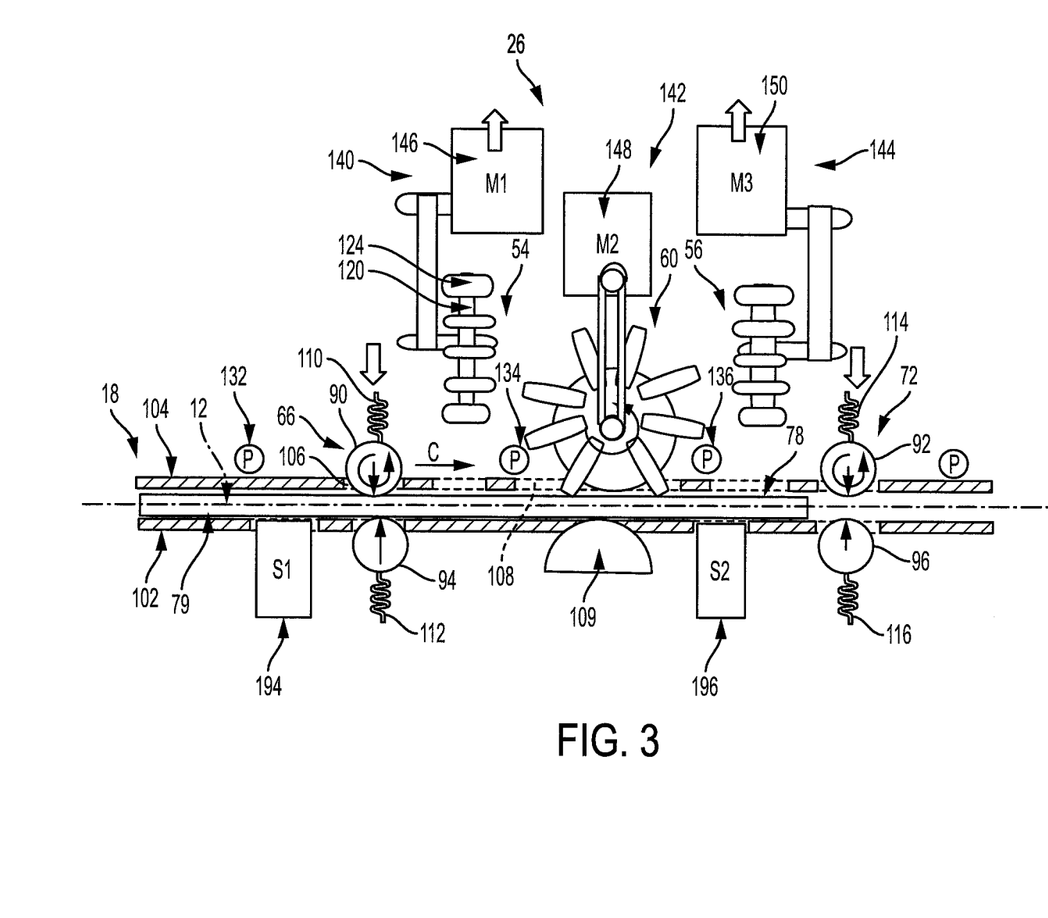
FIG. 3 is a side sectional view of one embodiment of the centering registration system of FIG. 1 with the centering registration system configured for transporting a sheet into a registration position.

As illustrated in FIG. 3, each pair of nip rollers includes one roller above the sheet and another below it, to form a nip in which the sheet is gripped. For example, each pair of nip rollers 66, 72, etc., includes a drive roller 90, 92 and an idler roller 94, 96 (or a second drive roller). Drive rollers in the same column 82 may be coaxial and may be driven by a common drive system, such as a motor 100 (for ease of illustration, only one motor is shown in FIG. 2).

As the sheet is conveyed by the nip rollers and/or omnidirectional rollers 58, 60, it is supported between lower and upper baffle plates 102, 104. As illustrated in FIG. 3, the nip rollers 90, 94, etc. and omnidirectional rollers 54, 56, 58, 60, are able to protrude through openings 106, 108, etc. in the baffle plates to make contact with the sheet. Beneath each omnidirectional roller 54, 56, 58, 60, a backing member 109, such as a rotatable ball or a fixed curved surface, may assist in supporting the sheet from below as it is maneuvered by the respective omnidirectional roller, and reduce resistance to movement of the sheet.

The registration system has first and second configurations for simple sheet advancement and for registration (with sheet advancement), respectively. In the first configuration of the registration system, for each of the nip rollers located near the omnidirectional rollers 54, 56, 58, 60, one or both of the nip rollers 90, 94 and 92, 96 in each pair is/are biased into contact with the sheet 12 by biasing members 110, 112, 114, 116, such as solenoids. In this configuration, the omnidirectional rollers 58, 60, having an axis rotation aligned with the process direction, may also be driven, while omnidirectional rollers 54, 56, having an axis rotation aligned with the cross-process direction, are not driven. In the second configuration of the registration system, the biasing force of the solenoids 110, 112, 114, 116, is released, such that the respective nip rollers 90, 94 and 92, 96 no longer grip the sheet and the sheet is moved solely by the omnidirectional rollers 54, 56, 58, 60.

Figure 4:
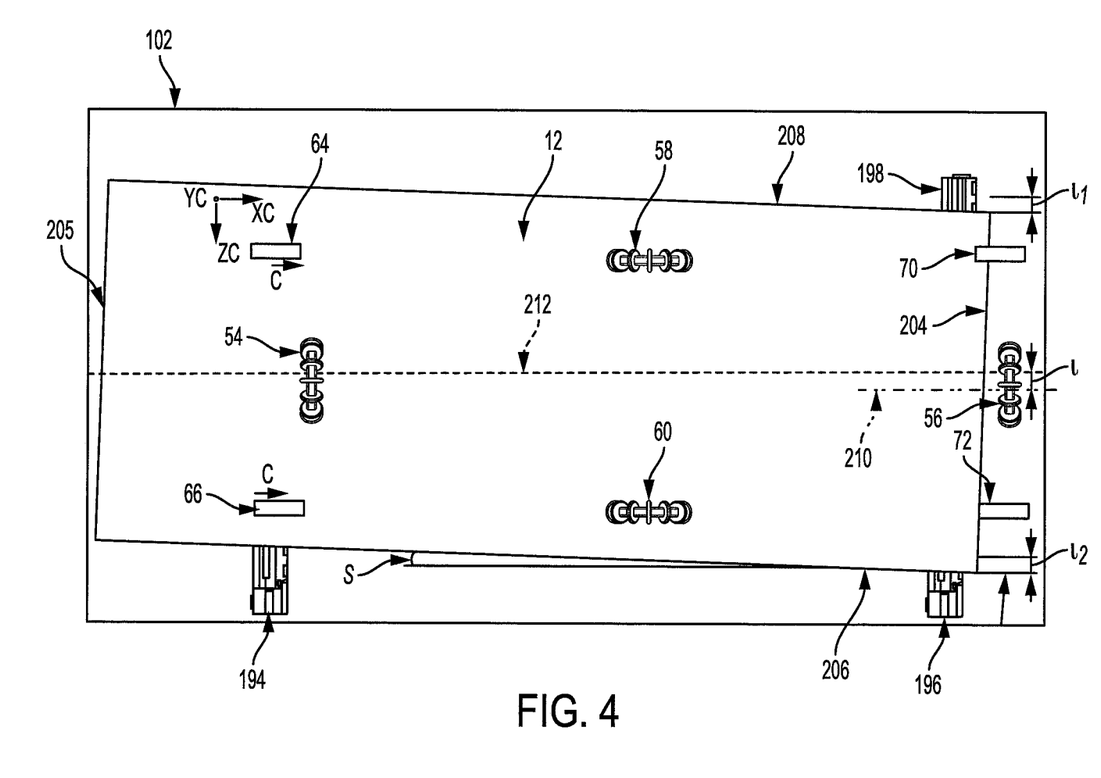
FIG. 4 is a perspective view of the centering registration system of FIG. 3, viewed from above, illustrating positions of transport wheels and paper skew and shift to be corrected.

FIGS. 3 and 4 illustrate the first configuration, in which the pairs 66, 72 of nip rollers are in an engaged position. In the engaged position, the nip rollers engage the sheet and serve to advance the sheet in the downstream direction. The omnidirectional rollers 58, 60 may also engage the sheet and serve to advance the sheet in the downstream direction. In one embodiment, in the first configuration, the omnidirectional rollers 54, 56 are raised such that they are not in contact with the sheet. In other embodiments, rollers 54, 56 are not raised to a position in which they do not contact the sheet. For example, the omnidirectional rollers 54, 56 make contact with the sheet but are not driven, allowing the sheet to slide underneath them. In the first configuration, the nip rollers are driven by motor(s) 100 (FIG. 2), causing the sheet 12 to move in the direction of arrow C into a position in which both omnidirectional rollers 54, 56 are able to contact the sheet.

Figure 5:
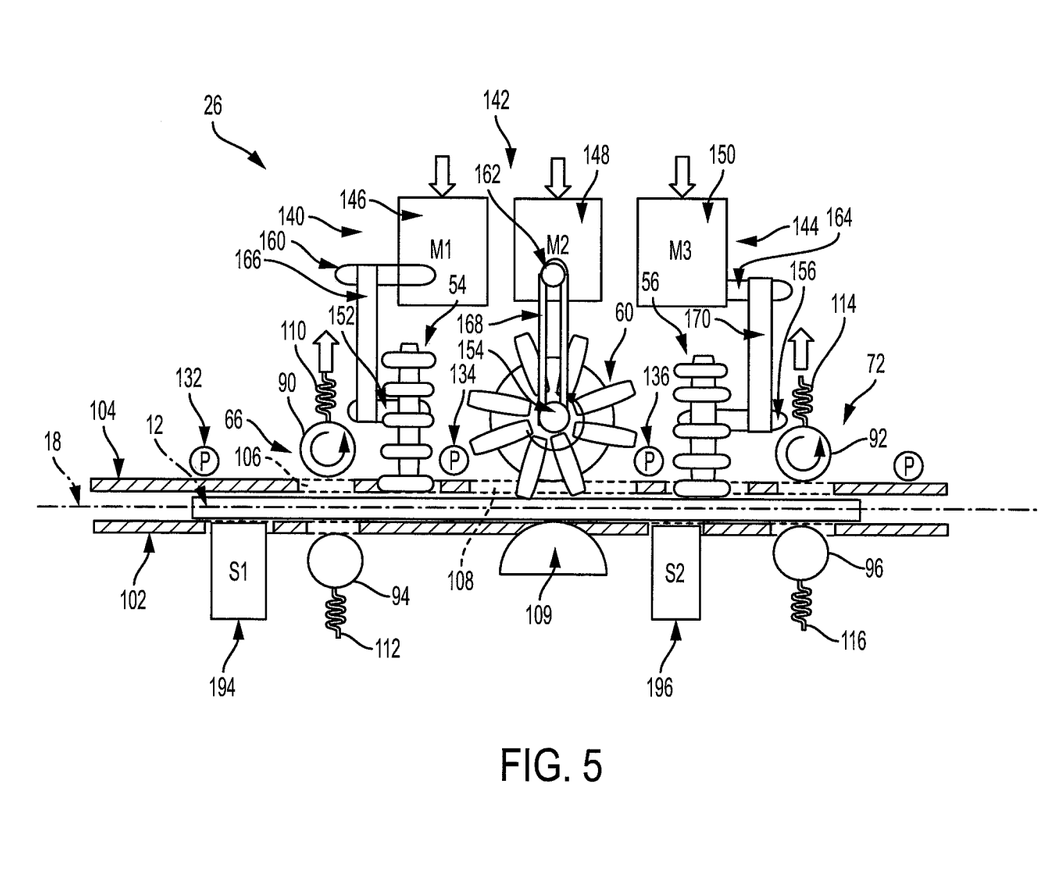
FIG. 5 is a side sectional view of the centering registration system of FIG. 1 with the centering registration system configured for registering a sheet.
Figure 6:
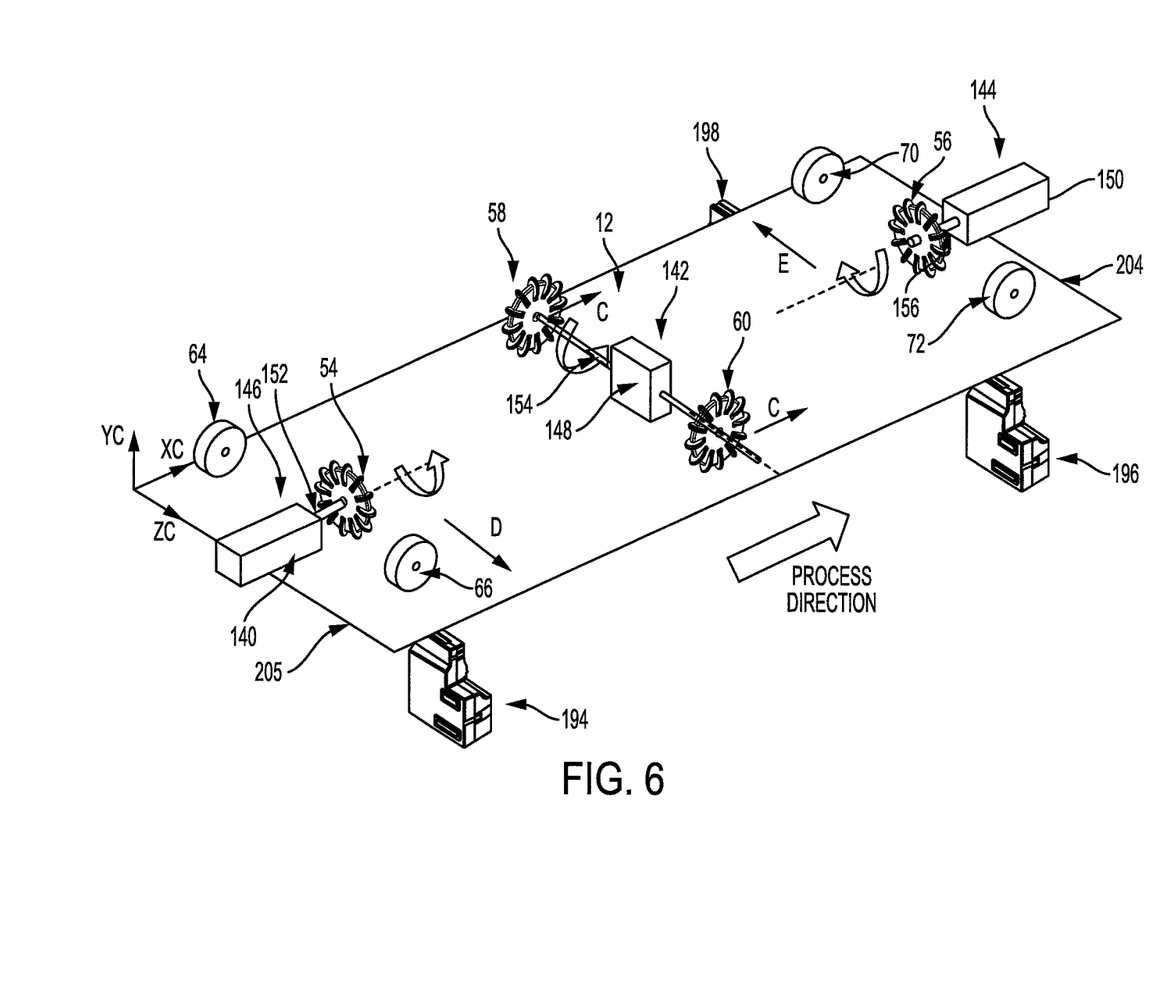
FIG. 6 is a perspective view of the centering registration system of FIG. 5, viewed from above, illustrating omnidirectional roller rotation during registration.

FIGS. 5 and 6 show the center registration system 26 in the second configuration, in which the omnidirectional rollers 54, 56 drive the sheet, in the directions of arrows D and E, to reduce skew and/or lateral shift, while omnidirectional rollers 58, 60 maintain movement of the sheet, as shown by arrows C, generally in the process direction. In this configuration, the nip rollers in pairs 64, 66, 70, 72 are released from the respective nip positions to a disengaged position (generally displaced from the sheet, although they may touch it lightly), in which they do not serve to advance the sheet.

Figure 7:
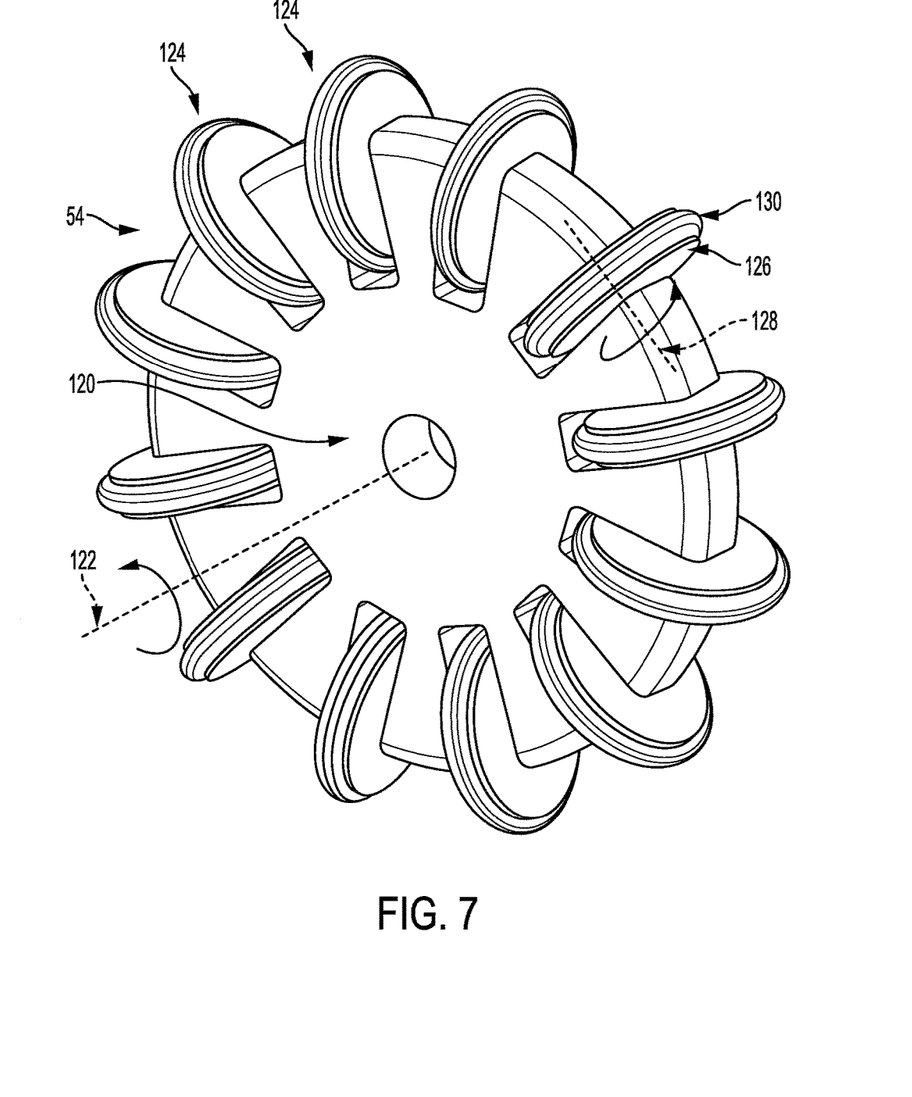
FIG. 7 is a perspective view of one embodiment of an omnidirectional wheel for use in the registration system of FIGS. 1-6.

With reference to FIG. 7, in an exemplary embodiment, each omnidirectional roller 54, 56, 58, 60 includes a drive hub 120 with a central axis of rotation 122. The drive hub is powered to rotate around the central axis, as for a conventional roller. The omnidirectional roller also includes small scuffer wheels 124, spaced around the perimeter of the hub 120. Each scuffer wheel 124 includes a wheel hub 126 that can rotate freely around a respective axis of rotation 128. The wheel axis 128 is perpendicular to the axis of rotation 122 of the drive hub 120. When the scuffer wheels 124 are rotated into contact with the sheet, they allow the sheet to slide under the wheels, in a direction parallel to the powered axis 122. Each wheel may have an outer rim 130 formed from a soft material, such as rubber, which avoids damage to the sheet 12 during sliding. There may be from 3 to 20 of the scuffer wheels on each hub, such as at least five or at least ten, or up to thirty scuffer wheels 124 on a respective hub 120. The sheet 12 can slip under the scuffer wheels in a direction parallel to the powered axis 122. In some embodiments, the omnidirectional rollers may include more than one hub, each hub carrying a respective set of wheels 124. Such an omnidirectional roller is described, for example in above-mentioned U.S. Ser. No. 15/939,907 and U.S. Pub. No. 20150284203.

As illustrated in FIGS. 5 and 6, the omnidirectional rollers 54, 56, 58, 60 are driven by one or more drive mechanisms 140, 142, 144. For example, omnidirectional rollers 58, 60 may be driven by a common drive mechanism 142, while omnidirectional rollers 54, 56 are separately driven, allowing the omnidirectional rollers 54, 56 to be driven at different speeds and/or in opposite directions. In the illustrated embodiments, each drive mechanism 140, 142, 144 includes a respective motor 146, 148, 150, which directly or indirectly drives a hub shaft 152, 154, 156 on which the respective hub(s) 120 is/are mounted. The motors 146, 148, 150 may be stepper motors. Motor 148 can be adjusted in speed to correct process direction error of the sheet by either speeding up or slowing down to get the sheet to the correct location. Motors 146, 150 can be adjusted in direction, to reduce skew and may also be adjustable in speed to ensure that larger skew adjustments can be effected during the time that the lateral omnidirectional rollers 54, 56 are in contact with the sheet.

For example, each motor may drive a respective drive shaft 160, 162, 164 (FIG. 5). The axial rotation of the drive shaft is transferred to the respective hub shaft 152, 154, 156 by a respective drive belt 166, 168, 170. However, other drive mechanisms are contemplated.

With reference once more to FIG. 2, the printer includes a feedback mechanism 180 including a control system 182 and sensors positioned along the paper path 18. The sensors include position sensors (P) 184, 186, 188, 190, 192, etc., and registration sensors (S1, S2, S3) 194, 196, 198. The position sensors 184, 186, 188, 190, 192 may be contact sensors, infrared sensors, visible light sensors, or any suitable sensor capable of detecting the presence/absence of a sheet in the respective position. Suitable registration sensors 194, 196, 198 include charge-coupled devices (CCD), contact image sensors (CIS), and similar sensor arrays. In some embodiments, capacitive sensors, ultrasonic sensors, optotransmissive sensors, and the like may be used as position and/or registration sensors.

The position sensors 184, 186, 188, 190, 192 are spaced along the paper path 18, in the process direction, and are used to detect the arrival of a sheet 12. In particular, the position sensors send sensor data 200 to the control system 182, which determines adjustments to be made to register the sheet and provides control data 202 containing information to alert relevant printer components, such as nip rollers and omnidirectional rollers, to take appropriate action. For example, when a leading edge 204 of the sheet is detected by position sensor 184 and/or 186, the sheet is determined to be entering the registration system. When sensor 190 detects the leading edge, the sheet has reached position 1 (SP1), and the registration sensors prepare to take sensor readings. When the leading edge 204 of the sheet is detected by position sensor 192, the sheet is determined to be in sheet position 2 (SP2), and the control data 202 for correcting the misalignment is sent to the drive mechanisms 140, 144 to adjust the speed and/or direction of rotation of the respective omnidirectional wheels. Control data 202 is sent to the solenoids for the nip roller pairs 64, 66, 70, 72 located within SP2, causing the nip rollers to disengage from contacting the sheet. The sheet is moved by the omnidirectional rollers towards sheet position 3 (SP3), downstream of SP2, where the nip rollers take over the transport of the sheet towards the marking engine 30.

As illustrated in FIG. 4, the registration sensors 194, 196, 198 are positioned to acquire sensor data 200 from which skew s and lateral shift/of the sheet is determined. Skew may be measured in degrees or radians while lateral shift/may be measured in mm or microns. For determining lateral shift, two registration sensors 196, 198 are positioned adjacent a respective opposite side edge 206, 208 of the sheet 12. The measurements from sensor 196 and sensor 198 are used to calculate the amount of lateral adjustment needed. By using both sensors 196 and 198 for making respective lateral registration measurements $l_1$, $l_2$, the system is registering both edges of the sheet. This provides a center registered system since the control system can determine where the center axis 210 of the sheet is, knowing where both edges 206, 208 are (in particular, l, the distance from a predefined central axis 210, may be computed as the mean of $l_1$ and $l_2$). The central axis 212 can be the desired central axis of the sheet, in the process direction. In another embodiment, the time when the paper leading edge 204 crosses sensor 196 and sensor 198 can be used to calculate the process direction error by determining how early or late the lead edge is, compared to when it is supposed to be crossing over the sensors.

For determining skew, contemporaneous readings from the registration sensors 196, 198 are taken and the number of pixels covered on each sensor is measured. The difference between the two sensor readings is calculated to determine the skew angle of the incoming paper.

As illustrated in FIG. 1, the control system 182 includes an input device 220, which receives the sensor data 200 into memory 222. Memory 222, or a separate memory, stores instructions 224, which are executed by an associated processor device 226, for generating control data 202, based on the sensor data 200. Data 202 are output from the control system 182 via a data output device 228. Hardware components 220, 222, 226, 228 of the control system may be communicatively connected by a data/control bus 230. The control signals 202 are received by the registration system 26. The registration system 26 makes registration adjustments, based on the control signals 202, with the aim of reducing detected lateral shift and/or skew, using the omnidirectional rollers. The control system 182 may also control other components of the printer, such as the sheet feeder 50, marking module 22, and stacker 40. In one embodiment, the control system receives input image data 240 representing an image to be rendered, and includes instructions for converting the image data 240 into output image data 242 in a form which can be interpreted and rendered by the marking engine 30.

The center registration system 26 operates to substantially reduce or eliminate misalignment of the sheet prior to marking of the sheet. In the exemplary embodiment, the registration is performed entirely by the omnidirectional rollers 54, 56, 58, 60, without use of any walls or other members which would act to constrain cross-process direction and/or process direction movement of the sheet. In combination, the registration rollers 54, 56, 58, 60 are able to rotate the sheet, with respect to the central axis 210, to reduce skew, and drive the sheet in the cross-process direction, to reduce lateral shift.

Figure 8:
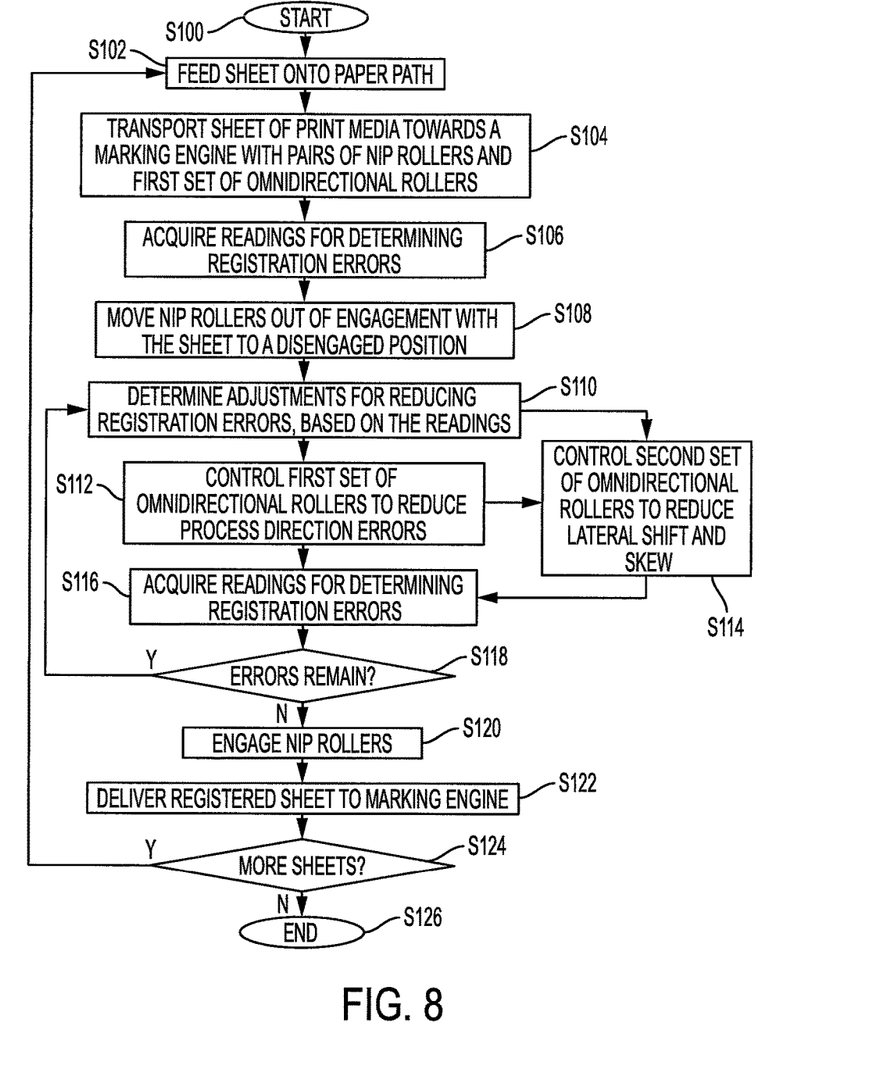
FIG. 8 is a flow chart illustrating a method of sheet registration.

With reference to FIG. 8, a method of registering a sheet is illustrated, which can be performed with the apparatus of FIGS. 1-7. The method begins at S100. It is assumed that a printing system has been provided with a center registration system 26.

At S102, a sheet is fed from the paper feeder 50 onto the paper path 18.

At S104, the sheet is conveyed downstream on the paper path by nip rollers that are in an engaged position, towards a marking device 30. When the sheet arrives at SP1, the first set of omnidirectional rollers 58, 60 assist the nip rollers in controlling the forward motion of the sheet to a position as shown in FIG. 4, where the readings for determining registration errors, such as lateral shift, skew, and process direction errors, are acquired by the registration sensors 194, 196, 198 (S106).

At S108, as the registration system is ready to correct the paper misregistration (e.g., when the sheet reaches S2, FIG. 4), nip pairs 64, 66, 70, 72 separate (move to a disengaged position), under the control of the control system, to allow the omnidirectional rollers 58, 60 to take control over driving the sheet forward through the paper path.

At S110, the control system determines adjustments to be made to reduce or eliminate the computed registration errors, based on the readings. For example, the sensor readings from the CCD sensors are converted to a number of steps for each of the stepper motors 146, 148, 148 for the computed adjustments to be made.

At S112, correction of process direction errors may be performed, if needed. In particular, the stepper motor(s) 148 powering the second set of omnidirectional rollers 58, 60 can be adjust slightly in speed to correct process direction error of the sheet by either speeding up or slowing down to get the sheet to the correct location.

At S114, which may occur contemporaneously with S112, or before or after S112, skew and lateral corrections are made. The second set of rollers 54, 56 are able to be driven independently of each other in both direction and speed. In the example shown in FIG. 4, the correction of lateral shift/and skews requires motor 150 to spin so that the leading edge 204 of the paper moves laterally in the direction of arrow E (inboard) and motor 146 to spin such that the trailing edge 205 moves laterally in the direction of arrow D (outboard) as shown in FIG. 6. The direction and number of steps is dependent, however, on the extent of the detected errors.

At S116, readings from all three registration sensors may be used to confirm that the paper has been moved to the correct location. If the registration sensors detect remaining errors (S118), the method may return to S110 for further adjustment.

At this point the paper has now been corrected for all three types of error and at S120, the pairs of nip rollers 70, 72, controlled by the controller, close again to help control the sheet and guide into the marking engine. At S122, the now registered sheet is delivered to the marking engine 30 to be marked, based on the image data.

If at S124, sheets remain to be marked, the method may return to S102 for the next sheet.

The method ends at S126.

In existing registration systems, lateral correction and skew correction are often performed sequentially, which takes more time than contemporaneous correction. Additionally, the skew correction for large sheets in existing systems is often hindered by a "tail-wagging" problem which adds additional error that has to be removed, adding additional time.

The present center registration system and method allow lateral and skew correction to take place at the same time. Additionally, the sheet is moved the minimum amount to correct the errors, since "tail-wagging" is not a significant problem. These reduce the cycle time needed for error correction and enable faster paper path speeds.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A registration system comprising:
   nip rollers for conveying a sheet in a process direction when the nip rollers are in an engaged position;
   omnidirectional rollers, including:
   a first set of omnidirectional rollers, which are spaced from each other in a cross-process direction and which have a roller axis of rotation parallel to the cross-process direction, for conveying the sheet in the process direction, and
   a second set of omnidirectional rollers, which are spaced from each other in the process direction and which have a roller axis of rotation parallel to the process direction, for conveying the sheet in the cross-process direction, the omnidirectional rollers each allowing the sheet to slide, relative to the omnidirectional roller, in a direction parallel to the axis of rotation of the omnidirectional roller, the nip-rollers being movable from the engaged position, in which the nip-rollers and first set of omnidirectional rollers convey the sheet in the process direction, to a disengaged position, in which the first pair of omnidirectional rollers convey the sheet in the process direction; and a feedback system which determines registration errors of the sheet and controls the omnidirectional rollers to reduce the registration errors in the sheet while the nip-rollers are in the disengaged position.

2. The registration system of claim 1, wherein each of the omnidirectional rollers has a central hub which rotates around the roller axis of rotation and a set of wheels, mounted around a periphery of the central hub, which are each free to rotate about a wheel axis of rotation which is perpendicular to the roller axis of rotation.

3. The registration system of claim 1, wherein the registration errors include a skew and a lateral shift of the sheet.

4. The registration system of claim 1, wherein the feedback system includes a set of registration sensors and a control system, the control system receiving readings from the registration sensors and computing adjustments to reduce a skew and a lateral shift of the sheet.

5. The registration system of claim 4, wherein the control system computes adjustments to reduce registration errors in the process direction and controls the second set of omnidirectional rollers to reduce the process direction registration errors.

6. The registration system of claim 4, wherein the registration sensors include three sensors, first and second of the sensors being adjacent a first side of the sheet and a third of the sensors being adjacent an opposite side of the sheet.

7. The registration system of claim 1, wherein the omnidirectional rollers are rotated about a respective axis of rotation by motors.

8. The registration system of claim 7, wherein the motors are stepper motors.

9. The registration system of claim 8, wherein the controlling of the omnidirectional rollers includes determining a number of steps for each of the stepper motors to take.

10. The registration system of claim 1, wherein each of the omnidirectional rollers in the second set is independently driven.

11. The registration system of claim 1, wherein a first of the omnidirectional rollers in the first set is intermediate a first pair of the nip rollers in the process direction and a second of the omnidirectional rollers in the first set is intermediate a second pair of the nip rollers in the process direction.

12. The registration system of claim 1, further comprising a baffle plate which supports the sheet while the sheet is conveyed by the nip rollers and the omnidirectional rollers.

13. The registration system of claim 1, wherein the nip rollers are arranged in pairs, each pair defining a nip for gripping the sheet therebetween in the engaged position.

14. The registration system of claim 1, wherein the registration system registers the sheet without using a wall to align the sheet.

15. A printing system comprising the registration system of claim 1 and a marking engine which receives the registered sheet from the registration system.

16. The printing system of claim 15, further comprising a sheet feeder which feeds sheets sequentially to the registration system.

17. A registration method comprising:

conveying a sheet in a process direction with nip rollers that are in an engaged position and a first set of omnidirectional rollers, the nip rollers and first set of omnidirectional rollers each having a roller axis of rotation parallel to a cross-process direction, for conveying the sheet in the process direction;

receiving readings for the sheet from registration sensors;

computing adjustments for a second set of omnidirectional rollers to reduce a skew and a lateral shift of the sheet, based on the sensor readings, the omnidirectional rollers in the second set each having a roller axis of rotation parallel to the process direction;

moving the nip rollers from the engaged position to a disengaged position; and while the nip rollers are in the disengaged position, implementing the adjustments with the second set of omnidirectional rollers and conveying the sheet in the process direction with the first set of omnidirectional rollers.

18. The method of claim 17, wherein the omnidirectional rollers each allow the sheet to slide, relative to the omnidirectional roller, in a direction parallel to the axis of rotation of the omnidirectional roller.

19. The method of claim 17, further comprising marking the registered sheet with a marking engine.

20. A printing system comprising:

a sheet feeder;

a marking engine; and a registration system on a paper path intermediate the sheet feeder and the marking engine, the registration system comprising:

pairs of nip rollers for conveying a sheet in a process direction when the nip rollers are in an engaged position, the nip rollers being movable to a disengaged position in which they do not convey the sheet;

a first set of omnidirectional rollers, including omnidirectional rollers which are spaced from each other in a cross-process direction and which have a roller axis of rotation parallel to the cross-process direction, for conveying the sheet in the process direction, the omnidirectional rollers in the first set being intermediate respective pairs of the nip rollers in the process direction;

a second set of omnidirectional rollers, including omnidirectional rollers which are spaced from each other in the process direction and which have a roller axis of rotation parallel to the process direction, for conveying the sheet in the cross-process direction, the omnidirectional rollers in the first and second sets each allowing the sheet to slide, relative to the omnidirectional roller, in a direction parallel to the axis of rotation of the omnidirectional roller;

a set of registration sensors which provide readings for determining registration errors in the sheet, the registration errors including a skew and a lateral shift of the sheet; and a control system which controls the second set of omnidirectional rollers to reduce the registration errors in the sheet while the nip-rollers are in the disengaged position.

* * * * *